(12) United States Patent
Agarwal et al.

(10) Patent No.: US 8,250,507 B1
(45) Date of Patent: Aug. 21, 2012

(54) DISTRIBUTING COMPUTATIONS IN A PARALLEL PROCESSING ENVIRONMENT

(75) Inventors: Anant Agarwal, Weston, MA (US); Michelle Leger, Edgewood, NM (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/909,521

(22) Filed: Oct. 21, 2010

Related U.S. Application Data

(63) Continuation of application No. 11/433,989, filed on May 15, 2006, now Pat. No. 7,840,914.

(60) Provisional application No. 60/680,927, filed on May 13, 2005.

(51) Int. Cl.
*G06F 17/50* (2006.01)

(52) U.S. Cl. ...................................... 716/110

(58) Field of Classification Search .................. 716/100, 716/110
See application file for complete search history.

(56) References Cited

U.S. PATENT DOCUMENTS

| | | | |
|---|---|---|---|
| 5,603,046 A | 2/1997 | Wiles et al. | |
| 5,694,577 A | 12/1997 | Kiyohara | |
| 5,801,958 A | 9/1998 | Dangelo et al. | |
| 6,260,189 B1 * | 7/2001 | Batten et al. .................. | 717/151 |
| 6,502,063 B1 | 12/2002 | Eriksson et al. | |
| 6,584,611 B2 | 6/2003 | Babaian et al. | |
| 6,988,183 B1 * | 1/2006 | Wong ............................ | 712/208 |
| 7,013,353 B2 | 3/2006 | Parthasarathy et al. | |
| 7,047,232 B1 | 5/2006 | Serrano | |
| 7,394,288 B1 * | 7/2008 | Agarwal ......................... | 326/39 |
| 7,461,236 B1 | 12/2008 | Wentzlaff | |
| 7,734,895 B1 | 6/2010 | Agarwal et al. | |
| 7,797,691 B2 | 9/2010 | Cockx et al. | |
| 7,818,725 B1 | 10/2010 | Agarwal et al. | |
| 7,840,914 B1 | 11/2010 | Agarwal et al. | |
| 2002/0019910 A1 | 2/2002 | Pitsianis et al. | |
| 2002/0138710 A1 | 9/2002 | Sih et al. | |
| 2003/0120899 A1 * | 6/2003 | Stotzer et al. ................. | 712/214 |
| 2003/0196197 A1 | 10/2003 | Fu et al. | |
| 2003/0200421 A1 | 10/2003 | Crook et al. | |
| 2004/0030859 A1 * | 2/2004 | Doerr et al. .................... | 712/15 |
| 2004/0088526 A1 | 5/2004 | Colavin et al. | |
| 2004/0226006 A1 | 11/2004 | Russell | |
| 2005/0166205 A1 | 7/2005 | Oskin et al. | |

(Continued)

FOREIGN PATENT DOCUMENTS

WO  WO 2004/072796  8/2004

OTHER PUBLICATIONS

Agarwal, Anant. "Raw Computation," *Scientific American* vol. 281, No. 2: 44-47, Aug. 1999.

(Continued)

*Primary Examiner* — Suchin Parihar
(74) *Attorney, Agent, or Firm* — Fish & Richardson P.C.

(57) ABSTRACT

A system comprises a plurality of computation units interconnected by an interconnection network. A method for configuring the system comprises accepting a set of instructions corresponding to a portion of a program that performs a computation repeatedly; identifying subsets of the instructions; and associating each subset with a different one of the computation units to form a specification of the set of instructions such that execution according to the specification forms a pipeline among at least some of the computation units.

17 Claims, 11 Drawing Sheets

U.S. PATENT DOCUMENTS

| | | | |
|---|---|---|---|
| 2005/0188364 A1 | 8/2005 | Cockx et al. | |
| 2006/0041872 A1 | 2/2006 | Poznanovic et al. | |
| 2006/0101104 A1 | 5/2006 | Bhanot et al. | |
| 2006/0179429 A1 | 8/2006 | Eggers et al. | |
| 2007/0011684 A1 | 1/2007 | Du et al. | |
| 2007/0043531 A1 | 2/2007 | Kosche et al. | |
| 2007/0083857 A1 | 4/2007 | Jiang et al. | |
| 2007/0089075 A1 | 4/2007 | Ward | |
| 2007/0124722 A1 | 5/2007 | Gschwind | |
| 2007/0150706 A1* | 6/2007 | Crook et al. | 712/219 |
| 2007/0174829 A1 | 7/2007 | Brockmeyer et al. | |
| 2007/0198971 A1 | 8/2007 | Dasu et al. | |
| 2007/0219771 A1 | 9/2007 | Verheyen et al. | |
| 2007/0299993 A1 | 12/2007 | Vorbach et al. | |
| 2009/0222654 A1* | 9/2009 | Hum et al. | 713/100 |
| 2009/0300337 A1* | 12/2009 | Wang et al. | 712/225 |
| 2010/0153654 A1 | 6/2010 | Vorbach et al. | |
| 2010/0235611 A1* | 9/2010 | Yamashita | 712/220 |
| 2011/0099553 A1* | 4/2011 | Agarwal et al. | 718/105 |

OTHER PUBLICATIONS

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et. al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et. al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Performance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Performance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.lcs.mit.edu/pub/raw/documents/RawSpec99.pdf>.

Moritz, Csaba Andras et. al., "Hot Pages Software Caching for Raw Microprocessors," *MIT/LCS Technical Memo LCS-TM-599*, Aug. 1999.

Sanchez, Jesus & Antonio Gonzalez, "Clustered Modulo Scheduling in a VLIW Architecture with a Distributed Cache." *Journal of Instruction Level Parallelism*, 3 (2001).

Rau, B. Ramakrishna, "Iterative Modulo Scheduling: An Algorithm for Software Pipelining Loops." Hewlett-Packard Laboratories, 1994.

Sanchez, Jesus & Antonio Gonzalez, "Modulo Scheduling for a Fully Distributed Clustered VLIW Architecture." Proceedings of the 33$^{rd}$ Annual ACM/IEEE International Symposium on Microarchitecture. Monterey, California, 2000 (pp. 124-133).

August, David et al. "A Framework for Balancing Control Flow and Prediction." In *1997 MICRO*, Dec. 1997.

Chu, Michael et al. Region-based Hierarchical Operation Partitioning for Multicluster Processors. In *2003 PLDI*, pp. 300-311, 2003.

Cytron, Ron et al. Efficiently Computing Static Single Assignment Form and the Control Dependence Graph. *ACM Transactions on Programming Languages and Systems*, 13(4):451-490, Oct. 1991.

Mahlke, S.A., et al. Effective Compiler Support for Predicated Execution Using the Hyperblock. In *1992 MICRO* pp. 45-54, 1992.

Larsen, Sam et al. "Increasing and Detecting Memory Address Congruence." In 2002 PACT, pp. 18-29, 2002.

Lee, Walter. Thesis: "Software Orchestration of Instruction Level Parallelism on Tiled Processor Architectures." May 2005, 138 pages.

Yang, T. et al. "DSC: Scheduling Parallel Tasks on an Unbounded Number of Processors." *IEEE Transactions on Parallel and Distributed System*, 5(9):951-967, 1994.

Fish & Richardson P.C., Unpublished for U.S. Appl. No. 11/433,989, filed May 15, 2006, 45 pages.

David A. Bader, A Practical Parallel Algorithm for Cycle Detection in Partitioned Digraphs [online], Sep. 21, 1999,[retrieved on Aug. 24, 2011]. Retrieved from the internet: <URL: http://www.cc.gatech.edu/-bader/papers/99013.pdf>. Pages 1-19.

Bradford L. Chamberlain, Graph Partitioning Algorithms for Distributing Workloads of Parallel Computations [online], Oct. 13, 1998,[retrieved on Aug. 24, 2011]. Retrieved from the internet: <URL: http://bluecoat-021?cfru=aHROcDovL2NpdGVzZWV yeC5pc3QucHN1LmVkdS92aWV3ZG9jL2Rvd25sb2FkP2Rva TOxMC4xLjEuOTcuNTU5MS.

Klauser, Artur. "Dynamic Hammock Predication for Non-predicated Instruction Set Architectures," Proceedings of the International Conference on Parallel Architectures and Compilation Techniques (PACT) 1998, 8 pages.

Kim, Hyesoon et al. "Wish Branches: Combining Conditional Branching and Predication for Adaptive Predicated Execution," Proceedings of the 36$^{th}$ Annual IEEE/ACM International Symposium on Microarchitecture (MICRO '05), 2005, 12 pages.

Chen, Deming et al. "FPGA Design Automation: A Survey," Foundations and Trends in Electronic Design Automation, vol. 1, No. 3, Nov. 2006, pp. 195-330.

Bharadwaj, Jay et al. "The Intel IA-64 Compiler Code Generator," Sep.-Oct. 2000, IEEE 2000, pp. 44-53.

Snavely, Noah. "Unpredication, Unscheduling, Unspeculation: Reverse Engineering Itanium Executables," IEEE Transactions on Software Engineering, vol. 31, No. 2, Feb. 2005, pp. 99-115.

Faraboschi, Paolo et al., "Instruction Scheduling for Instruction Level Parallel Processors." Proceedings of the IEEE, vol. 89, No. 11, Nov. 2001, pp. 1638-1659.

Mercaldi, Martha et al., "Instruction Scheduling for a Tiled Dataflow Architecture." ASPLOS '06 Oct. 21-25, 2006, 10 pages.

\* cited by examiner

DISTRIBUTING COMPUTATIONS IN A PARALLEL PROCESSING ENVIRONMENT

CROSS-REFERENCE TO RELATED APPLICATIONS

This application is a continuation of U.S. application Ser. No. 11/433,989, filed May 15, 2006 now U.S. Pat. No. 7,840,914, entitled "DISTRIBUTING COMPUTATIONS IN A PARALLEL PROCESSING ENVIRONMENT," which claims the benefit of U.S. Provisional Application No. 60/680,927, filed May 13, 2005, entitled "SPATIAL SOFTWARE PIPELINING OF A TILED ARCHITECTURE," each of which is incorporated herein by reference.

STATEMENT AS TO FEDERALLY SPONSORED RESEARCH

This invention was made with government support under Grant Number CNS-0305453 awarded by NSF. The government has certain rights in the invention.

BACKGROUND

The invention relates to distributing computations in a parallel processing environment.

FPGAs (Field Programmable Gate Arrays) and ASICs (Application Specific Integrated Circuits) are two exemplary approaches for implementing customized logic circuits. An ASIC is designed for a specific application. The cost of building an ASIC includes the cost of verification, the cost of physical design and timing closure, and the NRE (non-recurring costs) of creating mask sets and fabricating the ICs. Due to the increasing costs of building an ASIC, FPGAs became increasingly popular in the late 1990's. Unlike an ASIC, an FPGA is reprogrammable in that it can be reconfigured for each application. Similarly, as protocols change, an FPGA design can be changed even after the design has been shipped to customers, much like software can be updated. However, FPGAs are typically more expensive, often costing 10 to 100 times more than an ASIC. FPGAs are typically power hungry and their performance can be 10 to 20 times worse than that of an ASIC.

The MIT Raw integrated circuit design provides reconfigurability of an FPGA along with the performance and capability of an ASIC. The MIT Raw design is an example of a tiled integrated circuit (IC) providing a computational substrate as described, for example, in "Baring It All to Software: RAW Machines" IEEE Computer, September 1997, pp. 86-93. Techniques for compiling instructions and scheduling communication in Raw integrated circuits are described, for example, in "Space-Time Scheduling of Instruction-Level Parallelism on a Raw Machine," Proceedings of the Eighth International Conference on Architectural Support for Programming Languages and Operating Systems (ASPLOS-VIII), San Jose, Calif., Oct. 4-7, 1998, incorporated herein by reference.

SUMMARY

In one aspect, in general, the invention features a method for configuring a system comprising a plurality of computation units interconnected by an interconnection network. The method comprises accepting a set of instructions corresponding to a portion of a program that performs a computation repeatedly; identifying subsets of the instructions; and associating each subset with a different one of the computation units to form a specification of the set of instructions such that execution according to the specification forms a pipeline among at least some of the computation units.

Aspects of the invention can include one or more of the following features.

Identifying the subsets of the instructions comprises determining dependencies among subsets of the instructions corresponding to different portions of the computation.

The portion of the program performs a computation for a sequence of data values.

The portion of the program performs the computation for a temporal sequence of data values.

The portion of the program performs the computation for a spatial sequence of data values.

The specification designates the subsets of instructions for execution in respective computation units based on the determined dependencies.

Forming the pipeline comprises enabling a first subset of instructions to perform a portion of the computation for a first of the data values in a first computation unit while a second subset of instructions performs a portion of the computation for a second of the data values in a second computation unit, where the second subset of instructions depends on the first subset of instructions and the first data value occurs later in the sequence than the second data value.

The method further comprises designating a data value associated with executing an instruction in the first subset for communication over the interconnection network from the first computation unit to the second computation unit.

The portion of the program performs the computation for a sequence of values of a loop induction variable, and the first data value corresponds to a value of the loop induction variable in an iteration of the loop, and the second data value corresponds to a value of the loop induction variable in an earlier iteration of the loop.

Determining dependencies among subsets of the instructions corresponding to different portions of the computation comprises determining at least one instruction in a first subset that depends on data associated with executing an instruction in a second subset.

The data associated with executing the instruction in the second subset comprises data written by the instruction in the second subset.

The data associated with executing the instruction in the second subset comprises data characterizing an outcome of executing the instruction in the second subset.

The method further comprises associating instructions accessing the same data object with the same subset.

The specification designates the subsets of instructions for execution in respective computation units.

The data object comprises an array.

The array comprises a sparse array.

Identifying the subsets of instructions comprises associating instructions with the subsets to reduce at least some potential cyclic communication dependency among the computation units.

Associating the instructions with the subsets to reduce at least some potential cyclic communication dependency among the computation units comprises designating instructions that exhibit cyclic dependency for execution in the same computation unit.

Reducing at least some potential cyclic communication dependency among the computation units comprises reducing a number of communication cycles among the computation units.

Each of the communication cycles comprises a cycle of links among subsets of instructions designated to execute on different computation units, where a link represents a dependency between first instruction and a second instruction that accesses data associated with executing the first instruction.

Reducing at least some potential cyclic communication dependency among the computation units comprises reducing a size of at least one data communication cycle among the computation units.

Each of the communication cycles comprises a cycle of links among sets of instructions designated to execute on different computation units, wherein a link represents a dependency between first instruction and a second instruction that accesses the data associated with executing the first instruction.

Associating the instructions with the subsets to reduce at least some potential cyclic communication dependency among the computation units comprises assigning instructions to computation units such that a dependency graph representing data-bearing dependencies among instructions assigned to different computation units is acyclic.

The dependency graph has a tree structure.

The method further comprises assigning propagation of control flow information over paths among the computation units designated for data communication.

The method further comprises designating a control instruction associated with a control flow condition to be determined at runtime for execution in the same computation unit as instructions upon which the control instruction depends.

The method further comprises designating subsets of instructions with more frequent communication for execution in computation units connected by shorter paths through the interconnection network.

The accepted set of instructions comprises a basic block of instructions that are to be executed in a sequence determined before the instructions are executed.

The method further comprises loading the specification of the set of instructions into a memory unit accessible to at least one of the computation units.

The method further comprises distributing the subsets of instructions to the corresponding computation units when the system is booted.

In another aspect, in general, the invention features a computer program, stored on a computer-readable medium, for configuring a system comprising a plurality of computation units interconnected by an interconnection network. The computer program comprises instructions for causing a computer system to: accept a set of instructions corresponding to a portion of a program that performs a computation repeatedly; identify subsets of the instructions; and associate each subset with a different one of the computation units to form a specification of the set of instructions such that execution according to the specification forms a pipeline among at least some of the computation units.

Aspects of the invention can include one or more of the following features.

The computer program further comprises instructions for causing the computer system to generate the instructions corresponding to the portion of the program from a program specification.

In another aspect, in general, the invention features a system, comprising: a plurality of processor cores interconnected by an interconnection network; and information for configuring the a system to execute instructions that correspond to a repeated computation with each of a plurality of subsets of the instructions in a different one of the processor cores forming a pipeline among at least some of the processor cores.

Aspects of the invention can include one or more of the following features.

The system further comprises a memory for storing the information for configuring the processor cores.

The interconnection network comprises a two-dimensional network.

The interconnection network comprises a bus network, a ring network, a mesh network, or a crossbar switch network.

Each of the plurality of processor cores corresponds to a tile on an integrated circuit, each tile comprising: a computation unit; and a switch including switching circuitry to forward data received over data paths of the interconnection network from other tiles to the computation unit and to switches of other tiles, and to forward data received from the computation unit to switches of other tiles.

The computation unit comprises a pipelined processor and the switch is coupled to a plurality of pipeline stages of the pipelined processor.

At least one port of the switch is mapped to a register name space of the pipelined processor.

Aspects of the invention can have one or more of the following advantages.

A computation can be distributed over computation units in a parallel processing environment to enable pipeline parallelism among the computation units without requiring excessive synchronization among the computation units. An exemplary distribution technique called "spatial software pipelining" is described in a tiled IC parallel processing environment. The techniques described herein can be implemented in any of a variety of parallel processing environments. Various types of parallel processing environments include computation units interconnected by an interconnection network for exchanging data associated with computations being performed in the computation units.

Some parallel processing environments are chip-level multiprocessors (also called "chip multiprocessors" (CMPs) or "multicore processors") in which multiple processor cores on an integrated circuit are interconnected by an interconnection network or "interconnect" that enables communication among the processor cores. One type of CMP architecture is a tiled IC architecture in which a tiled array of processor cores (or "tiles") are interconnected by a network of switches connected to respective computation units within the processor cores. Other types of CMP architectures exist in which multiple processor cores include respective computation units interconnected by a shared interconnection network such as a bus, or a pipelined bus.

Some parallel processing environments include clusters of computers or processors that are not necessarily on the same integrated circuit. Interconnection networks can include any of a variety of types of wired or wireless communication media, or any of a variety of types of network topologies including mesh networks, busses, rings, or stars.

Some parallel processing systems include computation units configured or arranged to provide various types of functionality. For example, some systems include Very Long Instruction Word (VLIW) processors, or Digital Signal Processors (DSPs). Some systems include symmetric multiprocessors (SMPs) that operate the computational units in a symmetric way. Some systems include arrangements such as asymmetric multiprocessors (ASMPs), non-uniform memory access (NUMA), or clustered arrangements such as clustered VLIWs, clustered DSPs, or clustered VLIW DSPs.

The techniques for distributing a computation to be pipelined over multiple computation units can increase the efficiency of sparse matrix applications or applications with pipelinable loops with irregular accesses to memory. For example, sparse matrix applications use quite large data sets in array or matrix form, but frequently have nondeterministic access patterns. The pipeline distribution techniques can find appropriate data and instruction assignments for such applications.

In a spatial software pipelining technique, the instructions in a loop can be assigned to computation units to reduce the number of communication dependencies with other computation units. Spatial software pipelining distributes the loop instructions across multiple computation units to increases the throughput of the loop. The pipeline distribution techniques, including spatial software pipelining techniques, are useful when targeting a tiled architecture or multiprocessor, or when targeting a system having multiple computation units that have some form of interconnect or communication channels over which data values can be communicated between computation units.

Other features and advantages of the invention will become apparent from the following description, and from the claims.

DESCRIPTION

1 Tiled Circuit Architecture Overview

Figure 1:
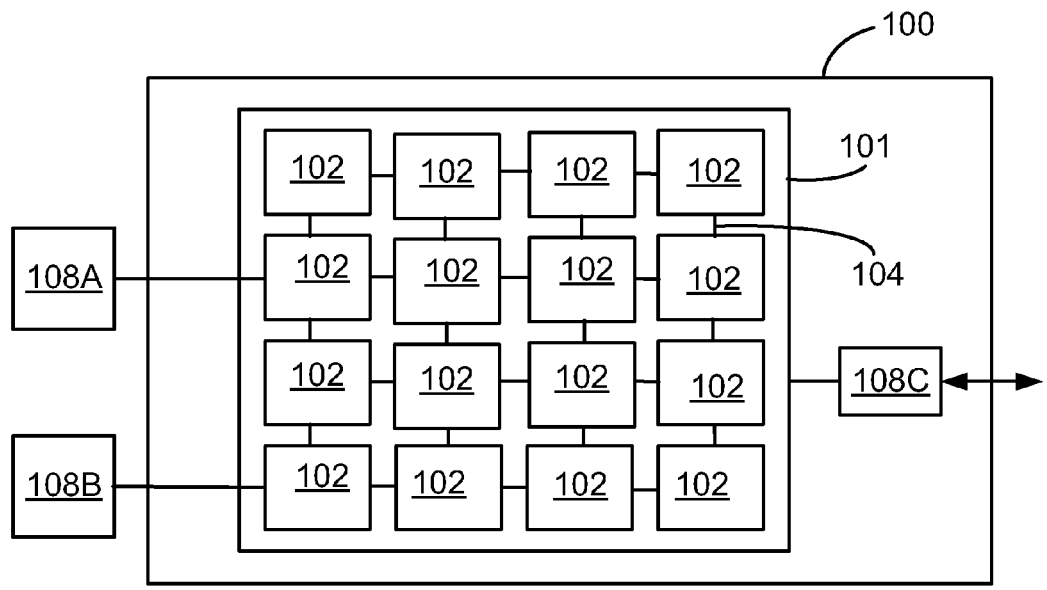
FIG. 1 is a block diagram of a tiled integrated circuit.

Referring to FIG. 1, an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 1 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the integrated circuit 100) to support parallel channels in each direction. Optionally, specific subsets of wires between the tiles can be dedicated to different mesh networks that can operate independently. In some examples, the network includes paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
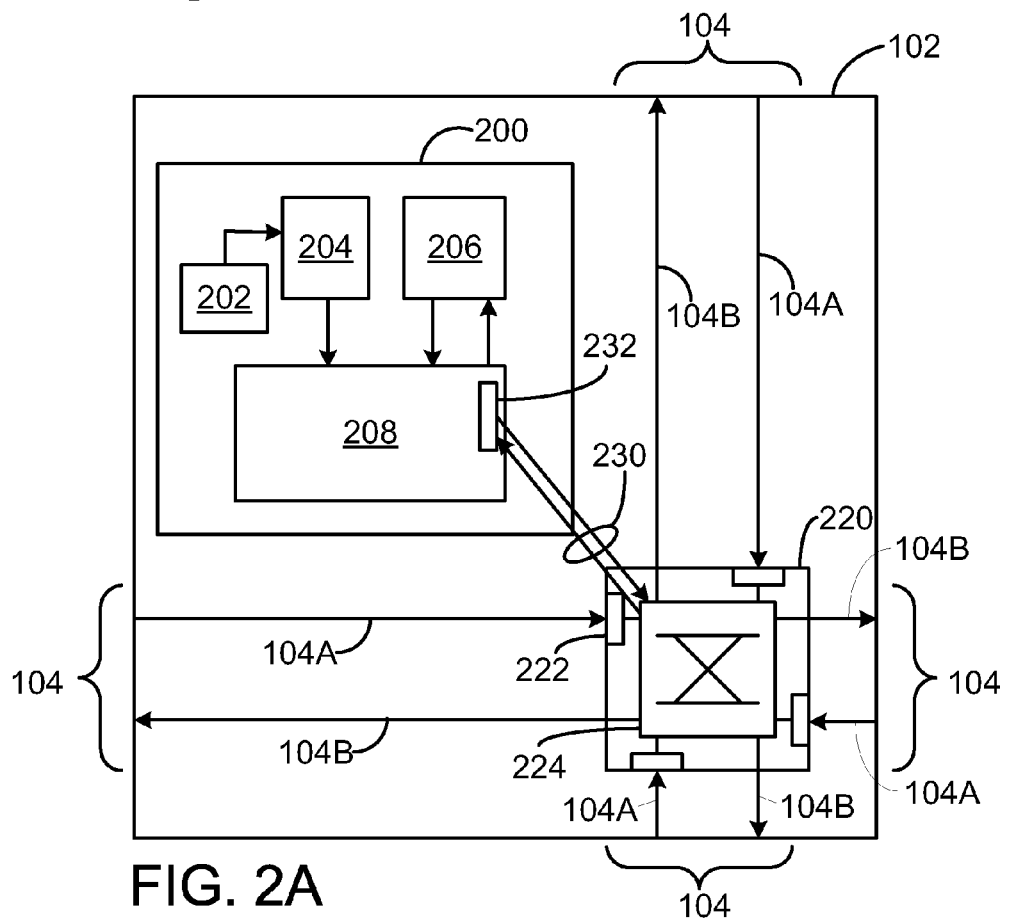
FIG. 2A is a block diagram of a tile.

Referring to FIG. 2A, a tile 102 includes a processor 200, a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit. The processor 200 can be multithreaded and/or have capabilities of a Very Long Instruction Word (VLIW) processor, a superscalar processor, or a vector processor.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

1.1 Switch Operation

Continuing to refer to FIG. 2A, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing." An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (e.g., in header information in the data). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Figure 2B:
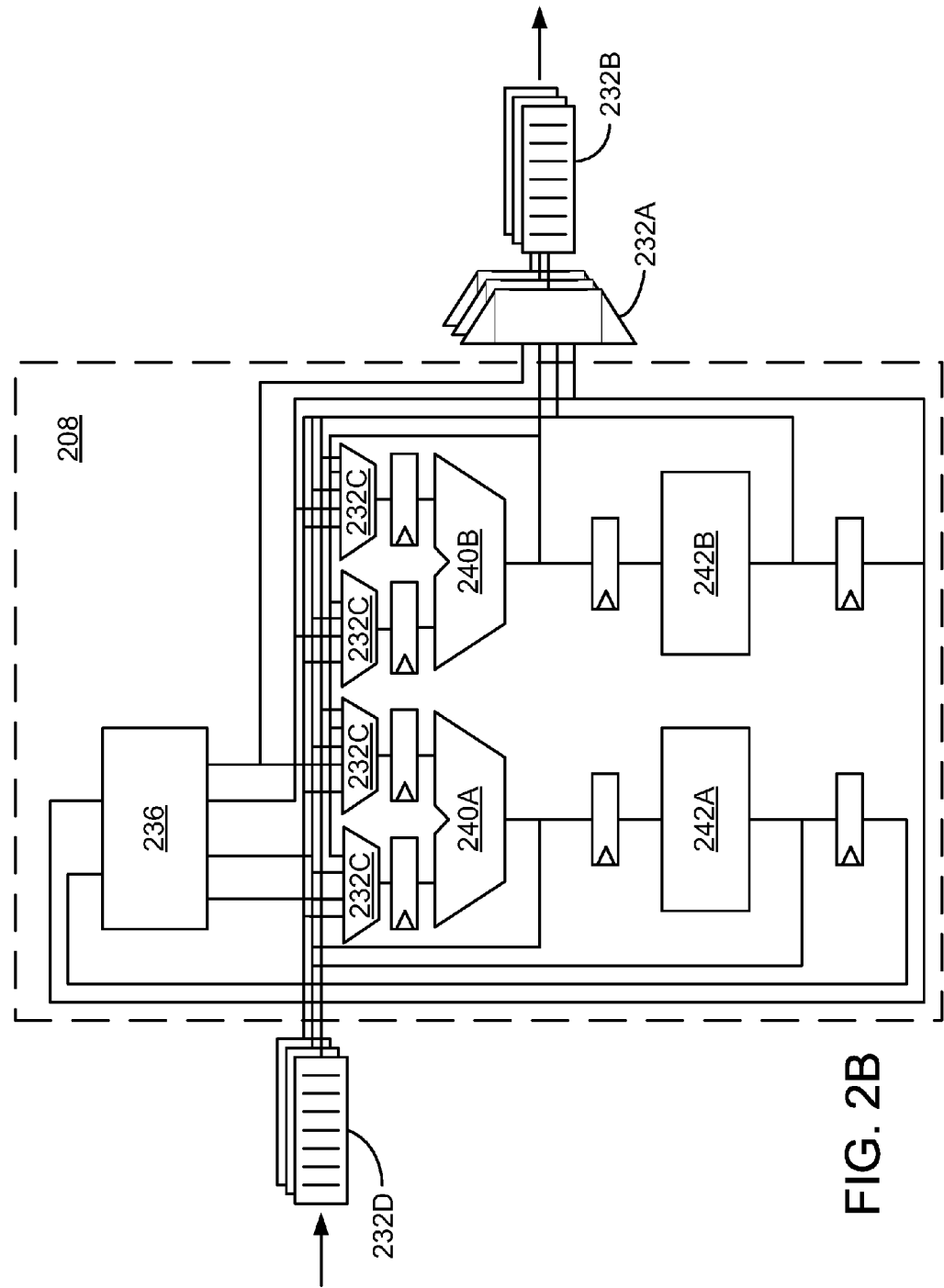
FIG. 2B is a block diagram of a pipeline integrated switch interface.

Referring to FIG. 2B, a register mapped pipeline integrated switch interface 232 (FIG. 2A) includes a set of multiplexers 232A and output buffers 232B coupled to different output ports of the static or dynamic switch. The switch interface also includes a set of multiplexers 232C that select data from a register file 236 or any of a set of input buffers 232D coupled to different input ports of the static or dynamic switch. The multiplexers 232C feed the inputs to logic units 240A and 240B. The output buffers 232B and input buffers 232D are mapped to the name space of the register file 236. When the processor 200 (FIG. 2A) reads from a register name mapped to a given switch port, data is taken from the corresponding input buffer 232D. When the processor 200 writes to a register name mapped to a given switch port, data is inserted into the corresponding output buffer 232B. The multiplexers 232A are able to select data from any pipeline stage (e.g., before or after the logic units 240A and 240B, or before or after functional units 242A and 242B) as soon as the value is available. If the processor 200 loads an instruction to read from an empty input buffer 232D or to write to a full output buffer 232B, the processor 200 will stall until it is able to proceed.

Figure 3A:
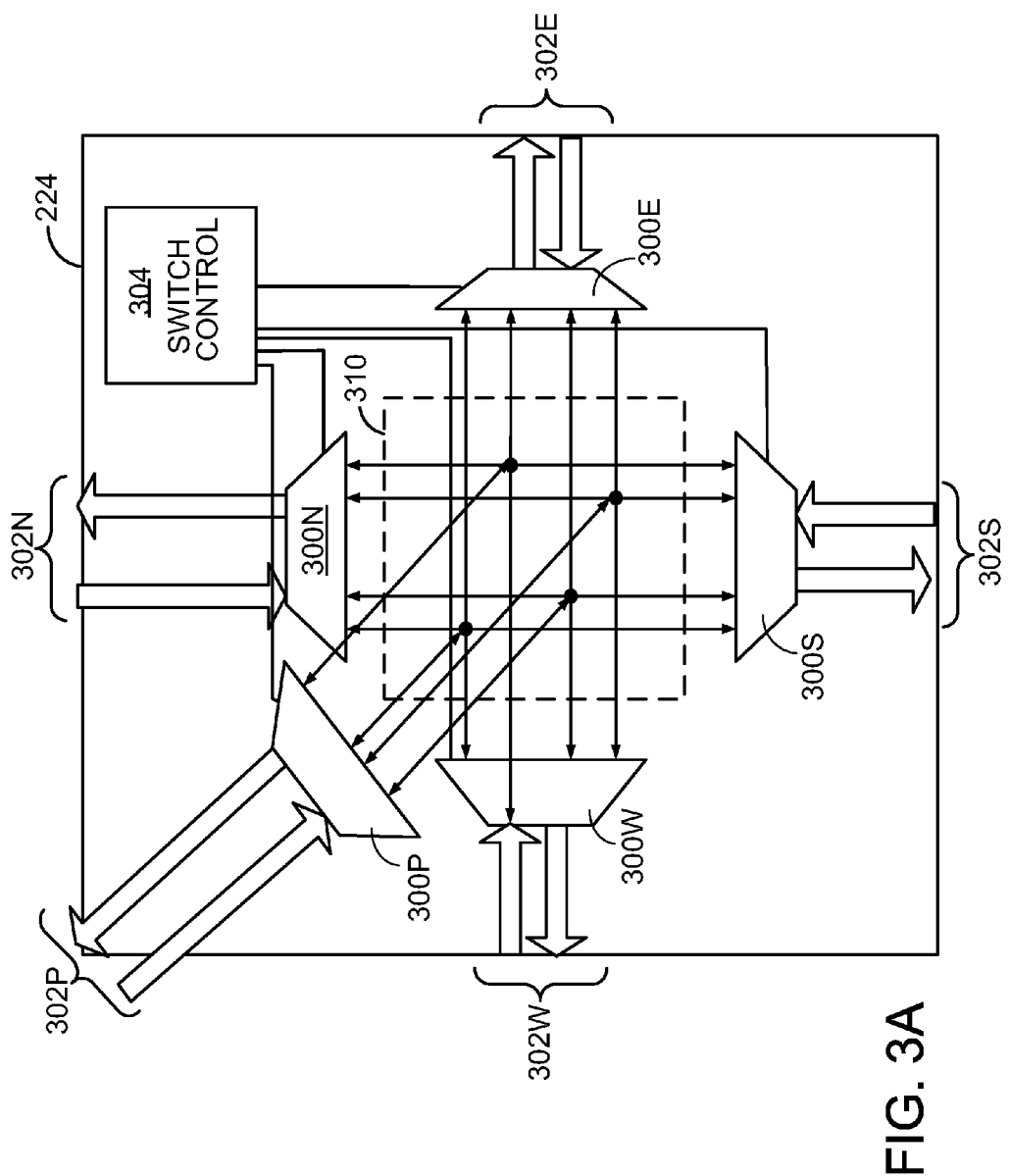
FIGS. 3A and 3B are block diagrams of switching circuitry.

Referring to FIG. 3A, switching circuitry 224 includes five multiplexers 300N, 300S, 300E, 300W, 300P for coupling to the north tile, south tile, east tile, west tile, and local processor 200, respectively. Five pairs of input and output ports 302N, 302S, 302E, 302W, 302P are connected by parallel data buses to one side of the corresponding multiplexer. The other side of each multiplexer is connected to the other multiplexers over a switch fabric 310. In alternative implementations, the switching circuitry 224 additionally couples data to and from the four diagonally adjacent tiles having a total of 9 pairs of input/output ports. Each of the input and output ports is a parallel port that is wide enough (e.g., 32 bits wide) to couple a data word between the multiplexer data bus and the incoming or outgoing wires 104A and 104B or processor coupling wires 230.

A switch control module 304 selects which input port and output port are connected in a given cycle. The routing performed by the switch control module 304 depends on whether the switching circuitry 224 is part of the dynamic network or static network. For the dynamic network, the switch control module 304 includes circuitry for determining which input and output ports should be connected based on header information in the incoming data.

Figure 3B:
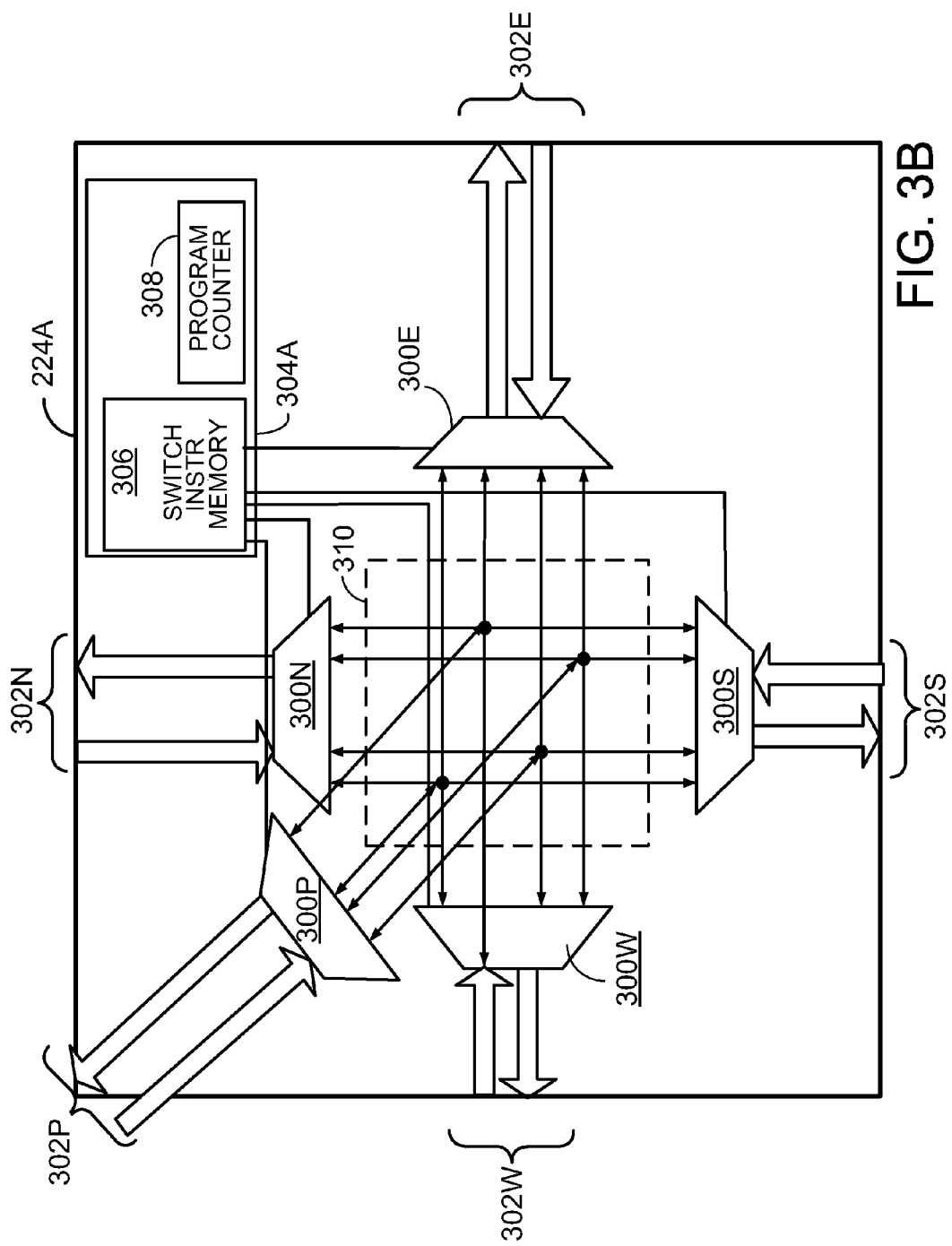

Referring to FIG. 3B, for the static network, the switch control module 304A of switching circuitry 224A includes a switch instruction memory 306 storing switch instructions that indicate which input and output ports should be connected. A switch instruction stored in the switch instruction memory 306 includes a subinstruction for each output port (in this case, five subinstructions). Each subinstruction represents a multiplexer select value which routes one of five input ports to the corresponding output port.

A program counter 308 steps through the switch instructions, interpreting control information (e.g., a condition code) in the switch instructions to perform actions such as branches or jumps based on program control flow. In a given clock cycle, the switch control module 304A can enable the multiplexers to move data independently onto any output port from any input port, including multicasting an input port to all output ports, as long as two input ports are not connected to the same output port in the same clock cycle.

The switch control module 304A is able to function as a switch processor with or without an ALU and registers. The switch control module 304A can include an ALU and registers to allow in-switch processing of in-flight messages. Optionally, the switch control module 304A can include other components such as a floating point arithmetic unit, or bit shifter, for example, to perform additional functions. In some examples the switch control module 304A can be a VLIW-type processor and/or be multithreaded.

The switches 220 include hardware and software mechanisms for providing flow control to ensure that data arriving at a full tile input buffer does not overwrite old data still pending in the buffer or cause deadlock. A switch 220 can include circuitry to detect full/empty states of buffers, and some of the wires in the data paths 104 of the static or dynamic network can be dedicated to communicating flow control information. In the dynamic network, the traffic patterns are unpredictable and there is a need for techniques for deadlock avoidance or deadlock detection and recovery. For example, buffers that become full can be overflowed into memory coupled to the switch 220 or the processor 200, or over one of the networks to off-chip memory. In the static network, the traffic patterns are controlled by the processing of switch instructions in a way that ensures correct delivery of data and avoids deadlock.

In a first approach to flow control for the static network, a processor 200 or switch 220 stalls if it is executing an instruction that attempts to read data from an empty input buffer 222 or from an empty processor output buffer 236, or send data to a tile with a full input buffer 222. This approach ensures correctness in the presence of timing variations introduced by dynamic events such as dynamic memory references and I/O operations.

In a second approach to flow control for the static network, the switch 220 can continue to process subinstructions of a macro switch instruction if data has arrived at the corresponding input buffers, and delay processing subinstructions if the corresponding input buffer is empty. The switch 220 is also notified that an input buffer at a connected tile that receives data from a given output port is full (e.g., via a full/empty bit). The switch 220 is able to continue processing switch instructions for other output ports while suspending only that output port.

In one implementation of this second approach, there is a switch instruction memory 306 (e.g., separate memory units or separate queues within a single memory unit) and program counter 308 for each output port to enable the switch 220 to operate independently on a separate stream of switch instructions for respective output ports. For example, the switch 220 can extract the instruction streams for respective output ports from an incoming macro switch instruction stream that includes subinstructions for the respective output ports. The condition code from a macro switch instruction can be included with each corresponding subinstruction of the extracted instruction streams. Alternatively, each subinstruction can include its own condition code based on the appropriate program logic. This second approach allows data that can be forwarded without sacrificing correctness to be forwarded without further delay.

1.2 Additional Circuitry

In some examples, a tile can include additional circuitry embedded within or coupled to the processor 200 and/or switch 220. The configuration of the circuitry in a tile can be controlled by local control information stored in the tile. For example, a module in the tile can be turned on or off or configured into a variety of modes based on the state of a "mode indicator" (e.g., one or more bits) stored in a register or other memory store.

A tile 102 can include various types of memory modules to serve as the instruction memory 204, data memory 206, or as a local memory store for other types of information such as control information for the tile. There can be a small SRAM bank in each tile in addition to a large SRAM bank. There can also be a larger DRAM bank in each tile. Each tile can have mode indicators used to select among these banks Any of the memory modules can be treated as a cache for a larger memory store outside the tile 102 or the integrated circuit 100. Such external memory (e.g., DRAM) is accessible over high bandwidth paths of one or more dynamic networks. The amount of memory can be chosen to roughly balance the areas devoted to processing and memory, and to match the memory access time and the processor clock.

A tile 102 can include Reconfigurable Logic (RL) that takes operands from registers and writes them back to registers after performing reconfigurable logic operations. The RL can be used for bit-level (or "gate-level") logic, and also for multi-bit-level (e.g., byte-level) logic. The operations performed by the RL can be specified by logic-level instructions supplied to the RL.

Functions such as virtual address translation, caching, global shared memory and memory protection can be implemented by any combination of hardware and software (e.g., processor instructions). A tile 102 can include a translation look-aside buffer (TLB) to translate virtual addresses as they come out of the processor 200 on each tile 102. A mode bit can turn off translation. The events such as cache miss or translation fault can trigger a trap or interrupt to the processor 200, so that the processor 200 can handle it in software. For example, there can be multiple trap lines to the processor 200. Alternatively, there are few trap lines, but there is a trap vector that the processor 200 can access which encodes the type of trap that occurred. There is a mode indicator which can allow selecting whether the software or the hardware handles these events. A hardware cache tag file can export a hit/miss status to the software rather than stalling the processor pipeline.

In a processor 200 in which the switch 220 is integrated into the bypass paths of the processor pipeline 208, the translation is performed before the data is sent (or committed) to the switch (e.g., before being written into a switch buffer to be sent out on any one of the static or dynamic networks). In this way, if there is a translation fault, then the data is not sent and the instruction can be safely aborted. Otherwise, data for which there has been a translation fault could corrupt program execution if sent over a network.

2 Software System 2.1 Overview

A software system for the tiled integrated circuit 100 includes a compiler that is able to schedule instructions in both time and space by generating both processor and switch instructions for arranging the static network. The compiler can also prepare messages to be sent over the dynamic network. The combination of the static network and the pipeline integration enables the compiler to orchestrate a calculation to be performed over multiple tiles with fast register-level communication between tiles. The software system can exploit both coarse-grained parallelism and fine-grained Instruction-Level Parallelism (ILP). The compiler can generate instructions from input code written in a high-level language such as C, Java, or C++, or a lower level language such as an assembly language, or Verilog, or SystemC.

The software system can exploit reconfigurable logic in each tile to construct operations that are uniquely suited for a particular application. This reconfigurable logic can be coded in a hardware description language such as Verilog or VHDL, or in a high-level language such as C.

The operating system (OS) for the integrated circuit 100 can include a Linux-like kernel or a similar kernel running on a single tile 102. Alternatively, the OS can be a distributed OS running on multiple tiles sending messages to each of the processes on each of the tiles.

The compiler can leverage the architectural features of the integrated circuit 100 by partitioning and scheduling ILP or data-level parallelism across the tiles. The compiler is able to automatically parallelize sequential applications across multiple tiles 102. For example, outer loops can be parallelized at a coarse-grained while inner loops can be parallelized at a fine grain, much as in a vectorizing compiler. When the compiler can identify commonly occurring instruction patterns or bit operations, they can be configured into special operations that will run in a single cycle using the reconfigurable logic.

Figure 4:
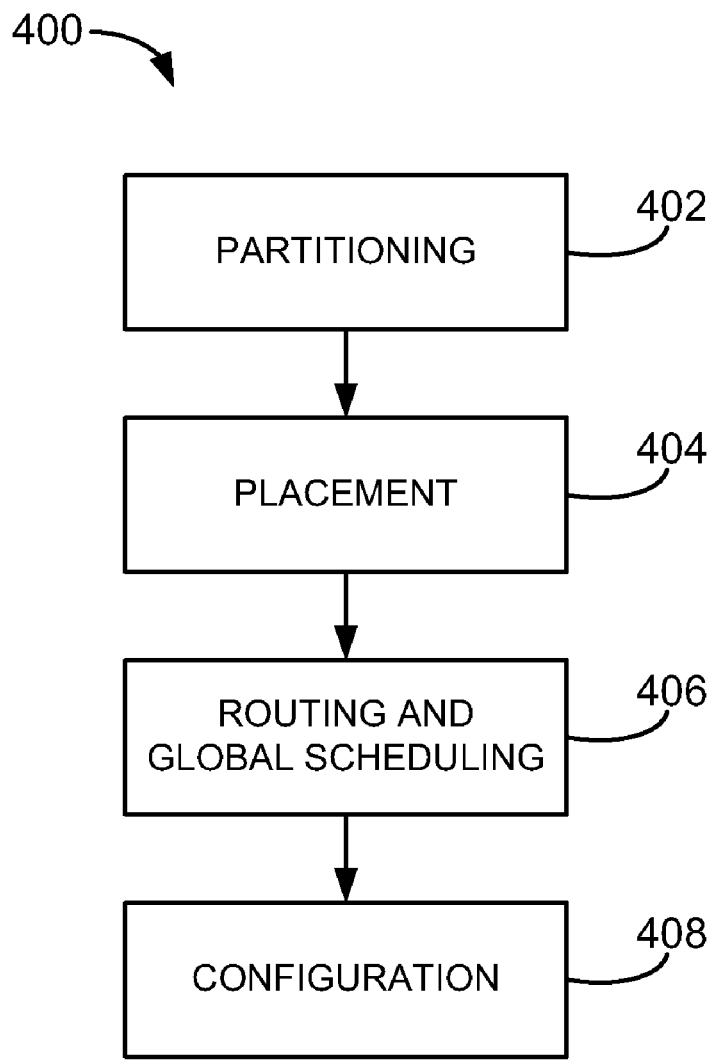
FIG. 4 is a flowchart for a compiling process.

Referring to FIG. 4, a compiling process 400 includes a number of stages. The compiler identifies and partitions for fine grain ILP in program by balancing the benefits of parallelism versus the overheads of communication and synchronization. In a partitioning phase 402, the compiler generates parallel code for a number of threads up to the number of tiles in the integrated circuit 100. In the partitioning phase 402, the compiler assumes an idealized fully-connected switch (an "ideal crossbar"), an unbounded number of virtual registers per tile, and symbolic data references. In a placement phase 404, the compiler removes the idealization of an ideal crossbar by selecting a one-to-one mapping from threads to physical tiles. The placement algorithm attempts to minimize a latency and bandwidth cost measure and can be, e.g., a variant of a VLSI cell placement algorithm. In a routing and global scheduling phase 406, the compiler allocates physical network resources with the goal of minimizing the overall estimated completion time of the program. The compiler output includes a program (e.g., a stream of instructions) for the processor 200 of each participating tile.

In an optional configuration phase 408, the compiler selects an application-specific configuration for reconfigurable logic to perform one or more custom operation. For each custom operation, the configuration compiler generates logic-level instructions for the reconfigurable logic and if necessary rewrites associated processor or switch instructions. For example, a compound operation involving multiple instructions is replaced by a call to the appropriate custom instruction using the reconfigurable logic. The compiler output includes a program (e.g., a stream of instructions) for each tile processor 200 and switch 220, and optional logic-level instructions. Alternatively, the compiler can generate logic-level instructions based on a separate hardware description language program.

In an exemplary implementation of the compiler, the compiler includes a main module to perform initial compiling and final preparation of instructions for the processor 200 and switch 220, and a pipeline distribution (PD) module that designates which instructions will be mapped onto which physical tiles by the main module in a way that reduces potential cyclic communication dependency.

2.2 Main Module

The main module processes a sequential high-level program using two sub-components: Maps and the space-time scheduler. Maps, the memory front end, is responsible for memory bank disambiguation, i.e., determining which memory references may be static accesses and to what data such accesses refer. The space-time scheduler, the back end of the main module, is responsible for mapping instructions and data to the tiles as determined by the PD module, as well as for scheduling instructions and communication. A more detailed description of an implementation of the Maps sub-component can be found in "Maps: A Compiler-Managed Memory System for Software-Exposed Architectures," PhD dissertation by Rajeev Barua, Massachusetts Institute of Technology, Department of Electrical Engineering and Computer Science, January 2000; "Memory Bank Disambiguation using Modulo Unrolling for Raw Machines," In Proceedings of the ACM/IEEE Fifth Int'l Conference on High Performance Computing (HIPC), December 1998; "Maps: A Compiler-Managed Memory System for Raw Machines," In Proceedings of the Twenty-Sixth International Symposium on Computer Architecture (ISCA-26), Atlanta, Ga., June 1999; and "Compiler Support for Scalable and Efficient Memory Systems." In Proceedings of IEEE Transactions on Computers, November 2001, each of which is incorporated herein by reference. A more detailed description of an implementation of the space-time scheduler sub-component can be found in "Space-Time Scheduling of Instruction-Level Parallelism on a Raw Machine," In Proceedings of the Eighth International Conference on Architectural Support for Programming Language and Operating Systems (ASPLOS-8), San Jose, Calif., October 1998, incorporated herein by reference.

The main module provides basic blocks of instructions to be processed by the PD module. A basic block is sequence of instructions without jump or branch instructions, and corresponds to a vertex in a program control flow graph. For example, a sequence of instructions forms a basic block if, under any possible program execution order, the instructions in the basic block execute in the sequence order with no other instruction executing between two instructions in the sequence. From one basic block, one or more subsequent basic blocks can be determined based on branch target addresses associated with branch instructions.

2.3 Pipeline Distribution Module

The PD module processes the instructions provided by the main module to distribute the instructions over multiple tiles to pipeline the corresponding computation over the tiles. The PD module also distributes the data for the computation over the tiles. The instructions are assigned to an instruction memory or cache accessible by the processor of the specified tile. The data are assigned to a local data memory or cache of the specified tile. For example, the data assigned to a tile can be stored in an external memory coupled to a tiled IC such that when the data is cached in the tiled IC the data will reside in the cache of the assigned tile.

The PD module accepts instructions (e.g., a basic block) generated by the main module from a portion of a program that performs a given computation. For cases in which the computation is processed according to a sequence of data values, the PD module pipelines the computation to enable different portions of the sequence to be processed in parallel. For example, if the computation includes a loop, the sequence of data values can be a sequence of values of a loop induction variable. In this case, different iterations of the loop can be processed in parallel. The computation can include processing a temporal sequence, such as data stream or a sequence of data objects. The computation can include processing a spatial sequence, such as a sequence corresponding to a 1-dimensional or 2-dimensional array (e.g., an image). The PD module determines dependencies among sets of the instructions corresponding to different portions of the computation. The PD module designates the sets of instructions for execution in respective tiles based on the determined dependencies.

The designation (or assignment) of instructions to tiles enables the computation to be pipelined over multiple tiles. A first tile that executes a first set of instructions to perform a portion of the computation can send results over the network to a second tile that that executes a second set of instructions to perform another portion of the computation. After sending the results to the second tile, first tile can begin to execute the first set of instructions for a next data value (e.g., for an i=1 loop iteration) while the second tile executes the second set of instructions for the previous data value (e.g., for an i=0 loop iteration) using the results from the first tile. Thus, in a computation that includes a loop, the PD module can distribute instructions so that different tiles are able to perform respective portions of a loop body for different iterations of a loop or different portions of a data stream or other sequence of data. The processing can reduce potential cyclic communication dependency among tiles. Communication cycles and other communication dependencies can enforce synchronization between tiles, which in some cases increases the execution time of loops. The PD module can decouple the tiles by removing unnecessary synchronization due to communication dependency between tiles. By removing cyclic communication dependencies, the PD module can cluster instructions and data such that the compiled code efficiently uses the processing power available. Removing cycles and other unnecessary synchronization may be done by arranging a communication dependency graph for the tiles (or portions of the graph) to resemble a tree by pipelining portions of a loop across designated computation units and communication across designated paths through the interconnect between computation units.

The following example illustrates distribution of a loop. In a first distribution technique, the compiler uses a round-robin process to distribute data and instructions among nine tiles. In a second distribution technique, the PD module uses a pipeline distribution process to distribute data and instructions among the tiles to take advantage of pipeline parallelism.

In the following program fragment:
for (i=0; i<100; i++) {
a[f[i]]=b[g[i]]+c[h[i]];
} values of the loop induction variable i, and the one-dimensional arrays a, b, c, f, g, and h are distributed to tiles as needed by instructions (e.g., assembly instructions) performing various parts of the computation a[f[i]]=b[g[i]]+c[h[i]]. For example, a tile executing an instruction that accesses one of the arrays receives an index for the array to be accessed. The value of the loop induction variable i that provides the index of arrays f[i], g[i], and h[i] is known by the compiler before run time, but the values of the index f[i] of array a[f[i]], the index g[i] of array b[g[i]], and the index h[i] of array c[h[i]] are not known by the compiler before run time. Thus, the compiler schedules distribution of the loop induction variable i over the static network, and schedules distribution of the arrays f, g, and h over the dynamic network.

Figure 5A:
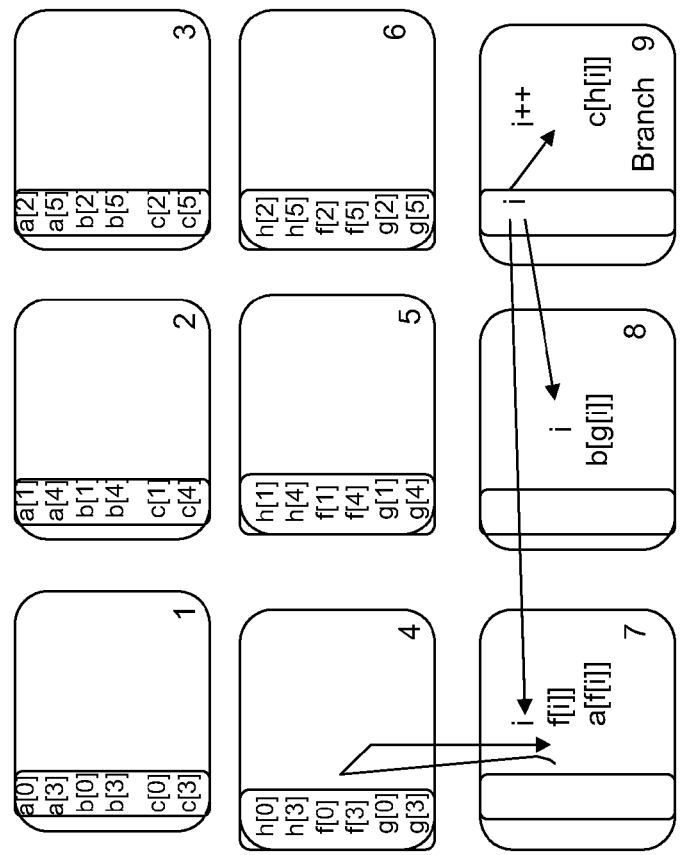
FIGS. 5A-5E are diagrams of computations distributed on an array of tiles.

In the first distribution technique the compiler distributes each of the arrays f, g and h in a round-robin placement over tiles 4, 5, and 6 as shown in FIG. 5A. Similarly, the compiler distributes each of the arrays a, b, and c in a round-robin placement over tiles 1, 2 and 3 as shown in FIG. 5A. The compiler places instructions the index i on tile 9 as well as the instructions that increment i and determine a branch condition for the loop. The compiler distributes the instructions for performing the computation in the loop body to tiles, and schedules communication of data among the tiles as described below.

Tile 7 is assigned an instruction that accesses a[f[i]], tile 8 is assigned an instruction that accesses b[g[i]], and tile 9 is assigned an instruction that accesses c[h[i]]. The value of the index i stored on tile 9 is scheduled to be sent to tiles 7 and 8 over one of the networks (e.g., a static network). Tile 7, for example, then sends the index i for accessing the array value f[i] to tile 4. Tile 4 then accesses f[i] and sends the accessed data value back to tile 7. Tile 7 now has the value f[i] for accessing a[f[i]].

Figure 5B:
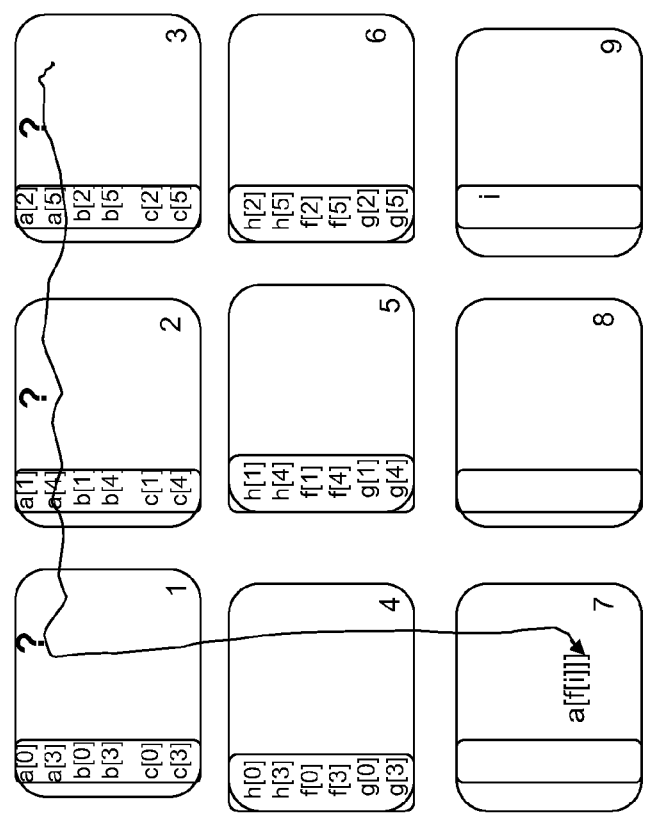

Since this value f[i] is received at run time, the compiler does not know whether the value f[i] will receive a value from tile 1, 2 or 3 to complete the instruction that accesses a[f[i]], as illustrated in FIG. 5B. Because the exact tile location of f[i] is not known at compile time, the dynamic network is used to route the value among the tiles.

Figure 5C:
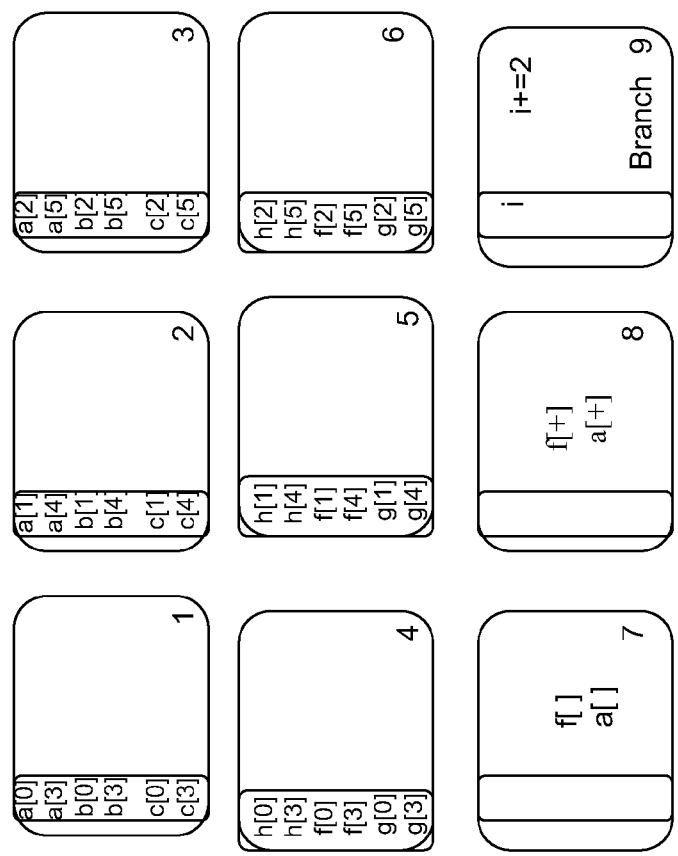

An example of a situation in which a potential error can arise using this first technique is a case in which there are multiple simultaneous references to the same array. Referring to FIG. 5C, the loop has been unrolled such that computation previously computed in two consecutive iterations are computed in the same iteration. The loop iteration condition changes from i++ to i+=2.

The references a[ ] and a[+] represent reference to array "a" from two consecutive iterations. The compiler has placed these two references on two different tiles 7 and 8. It is possible that both tiles 7 and 8 will issue the references a[ ] and a[+] simultaneously (or possibly "out of order" such that that a[+] is issued earlier than a[ ]). If the value of the respective indexes f[ ] and f[+] corresponding to a[ ] and a[+] are different, then the simultaneous or out of order issue of the references does not generate an error. However, if the two indexes f[ ] and f[+] happen to be the same (which is possible, since the two indexes have been computed dynamically at run time), then an error may result from simultaneous or out of order issue of the references. The sequential semantics of the program fragment above require that the value of a[+] be left in the array "a" at the index f[+] after the unrolled iteration. However, if a[+] is issued before a[ ], then the value of a[ ] will be left in the array "a" at the index f[ ]=f[+] after the unrolled iteration. Since the compiler has no way of knowing apriori the locations of a[ ] and a[+], and since the compiler must transmit the values over the dynamic network (which may have unpredictable delay), the compiler cannot guarantee with ease that one or the other reference issue before the other when the two references are assigned to different tiles.

Figure 5D:
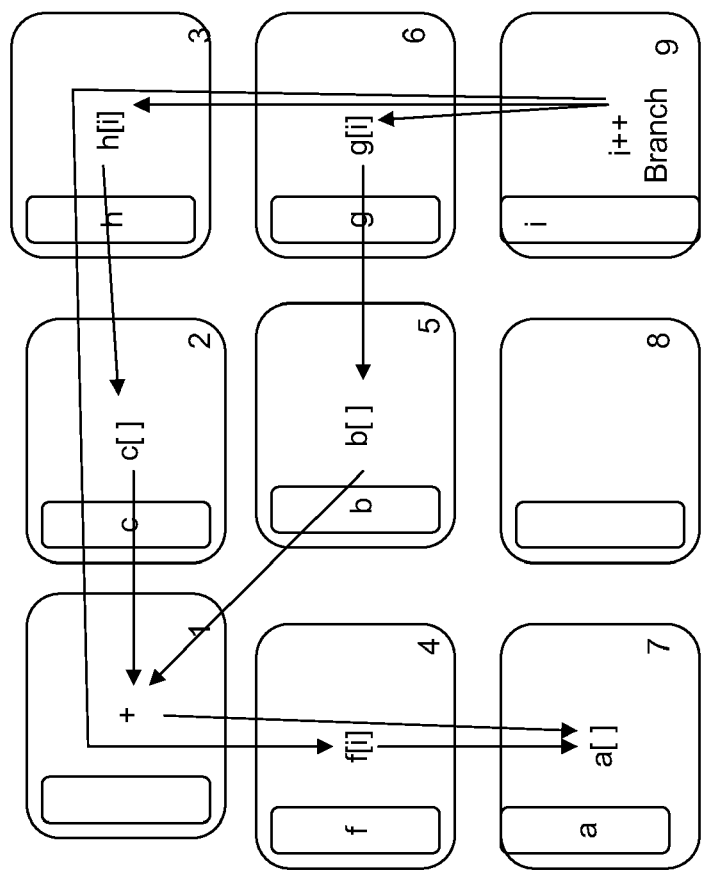

In the second distribution technique, the PD module uses a pipeline distribution process to distribute data and instructions among the tiles. In this example, the PD module assigns each array to one tile. Referring to FIG. 5D, a is assigned to tile 7, b is assigned to tile 5, c is assigned to tile 2, f is assigned to tile 4, g is assigned to tile 6, and h is assigned to tile 3. (In a tiled IC with caches on each tile for external memory, the arrays can be stored in the external memory and when data is cached on the tiled IC, the data will reside in the cache of the assigned tile). The index i is assigned to tile 9 as well as the instructions that increment i and determine a branch condition for the loop.

The PD module generates a dependency graph between the instructions in the loop body. The directed edges in the dependency graph indicate which instruction depends on which other instruction. The PD module uses this dependency graph to distribute the instructions of the loop body on the tiles to pipeline the computation such that the data from the arrays are fetched and sent from one tile to another without forming a communication cycle within an iteration. Thus, the PD module arranges the instructions on the tiles such that there are no cycles in a dependency graph between tiles. The directed edges in the tile dependency graph indicate which tiles depend on (e.g., receive data from) which other tiles. After all the instructions corresponding to iteration i in a tile T execute, the tiles that depend on (e.g., receive data from) this tile T will all be able to execute their instructions. Furthermore, after tile T sends data for iteration i downstream in the tile dependency graph, the tile T will be able to commence executing iteration i+1 while the tiles that depend on tile T are still working on iteration i, since there are no backward dependency edges back to tile T.

Thus, as shown in FIG. 5D, the array index i is fetched in tile 9, incremented in tile 9, and sent to tile 6 (and other tiles). On tile 6, g[i] is fetched. The resulting value of g[i] is then sent to tile 5, where it is used to fetch b[g[i]]. The value of b[g[i]] is then sent to tile 1, where it is added to c[h[i]] (which was generated along a path from tile 9 to tile 3 to tile 2 to tile 1) and then the result is sent to tile 4, and so on. The path from tile 5 to tile 1 can be routed through another tile (e.g., tile 2).

While tile 4 is working on a given iteration, such as iteration i, tile 5 could be working on the next iteration, such as iteration i+1, and tile 6 could be working on iteration i+3, for example. To match up timings between the paths 9, 6, 5, 1, 4 and 9, 3, 2, 1, 4, the tiles may buffer values, for example, between tiles 6 and 5. Thus, the PD module arranges dependency relationships between tiles as a tree or a DAG, as shown in FIG. 5D.

Figure 5E:
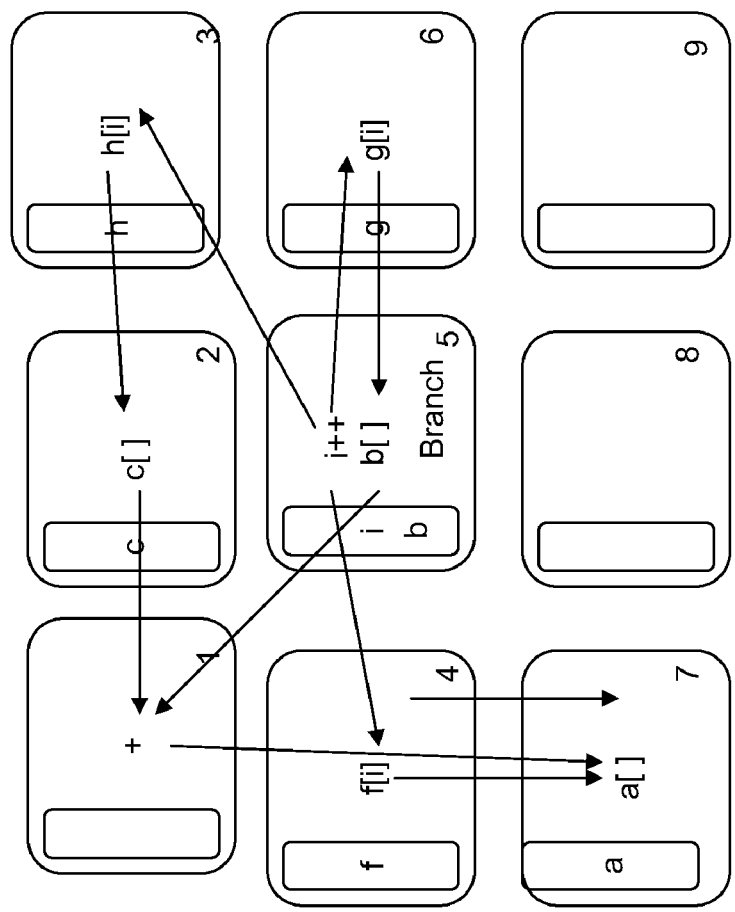

FIG. 5E shows what happens when the tree (or DAG) structure is violated in the tile dependency graph and a cycle is introduced. In this example, the PD module assigns the location of the index i to tile 5 and increments the index i on tile 5. In this example, there is a dependency cycle (due to a data communication cycle) between tiles 5 and 6 and the pipelining effect is lost. In this case, for a new iteration, i++ is computed on tile 5. Then the incremented value of i is sent to tile 6, where g[i] is fetched. However, tile 5 cannot proceed to the next iteration, incrementing i to i+1, while tile 6 is fetching g[i] because of the cycle. The next iteration cannot start because the instruction on tile 5 that fetches b[g[i]] is waiting for the value of g[i] from tile 6 before it can continue. After the value of g[i] arrives from tile 6, tile 5 continues and completes the b[g[i]] fetch, and then is able to increment i to i+1. Thus, the instructions on tiles 5 and 6 execute in a serial manner, with one following another during an iteration, and there is no pipeline parallelism between the two allowing a new iteration to start before the previous iteration ends because of the cycle between them.

3 Pipeline Distribution Process

In an exemplary pipeline distribution process, the PD module receives (e.g., from the main module), or generates, information characterizing a dependency graph between instructions within a basic block. For example, the dependency graph can be characterized by a list of the instructions to be executed in each basic block including information about each instruction (e.g., cost, latency); a list of the dependencies between instructions within the basic block; and a mapping from each instruction to a tileID, where two instructions that have the same tileID are designated for execution on the same tile. The lists of instructions and dependencies together specify a dependency graph on the instructions, or an "instruction dependency graph." Since an instruction does not depend on it's own result, the instruction dependency graph is a directed acyclic graph, or DAG. The mapping provides a mechanism for ensuring that certain instructions, possibly in different basic blocks, execute on the same tile.

The PD module also receives a list of the memory objects accessed in the basic block, and a mapping from each memory instruction (e.g., a load or a store instruction) to the memory object that the instruction accesses. This map provides another mechanism for determining which instructions are designated to execute on the same tile. Load and store instructions to and from a given memory object (e.g., an array) are assigned to the same tile as the memory object to make use of data affinity.

Figure 6:
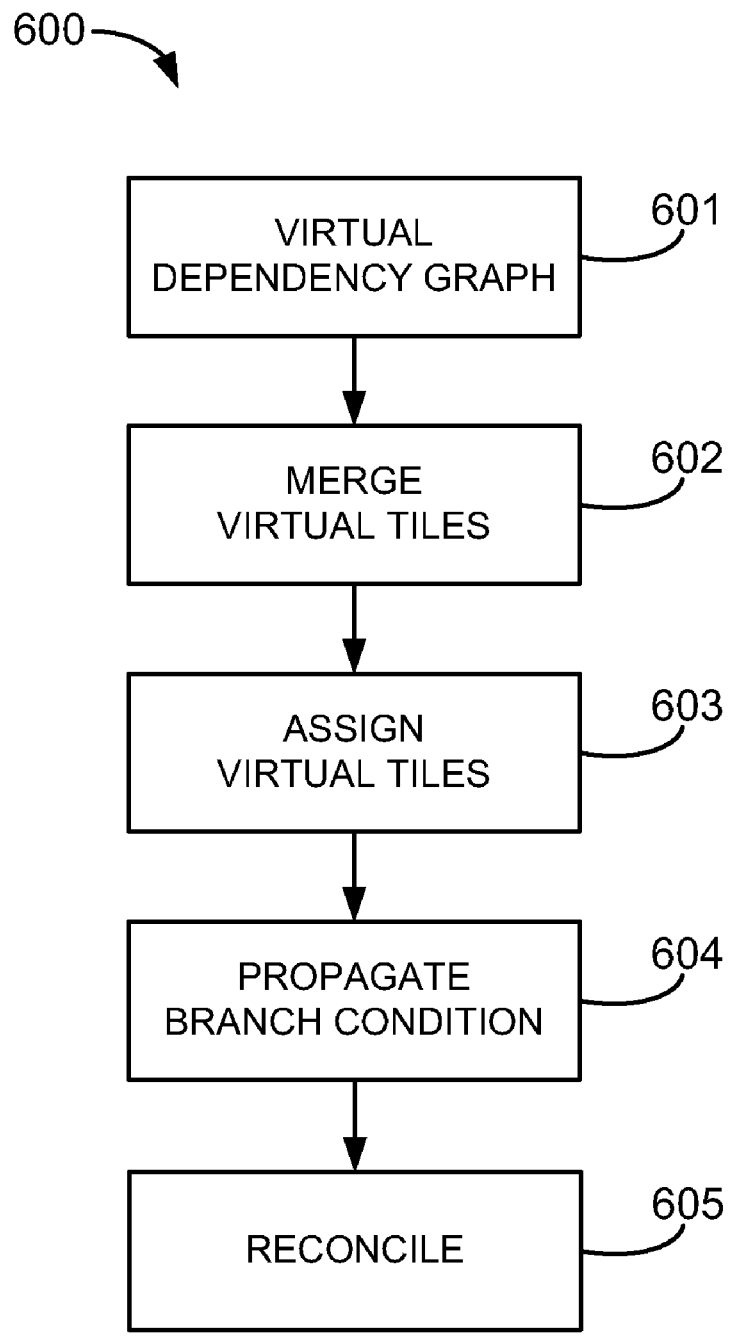
FIG. 6 is a flowchart for a pipeline distribution process.

Referring to FIG. 6, the pipeline distribution process 600 includes a first phase 601 in which the PD module generates a "virtual dependency graph" based on the instruction dependency graph. The virtual dependency graph incorporates the constraint that instructions with the same tileID are assigned to the same tile and, similarly, that instructions accessing the same memory object are assigned to the same tile. The nodes in the virtual dependency graph are "virtual tiles" and the links in the virtual dependency graph are "virtual dependencies" that represent communication and other dependencies.

In a second phase 602, the PD module merges the virtual tiles together in a bottom up greedy fashion until the number of virtual tiles is less than or equal to the number of physical tiles. In a third phase 603, the PD module assigns each virtual tile to a physical tile using a cost function that places a high cost on assignments having communication cycles among tiles (e.g., the cost increases with the number of tiles in a communication cycle).

In a fourth phase 604, the PD module creates branch condition propagation paths as needed based on the ultimate tile assignment. A branch condition (e.g., for a loop) is propagated to all tiles assigned instructions from the loop body. Thus, if an instruction that computes the branch condition depends on (receives data from) any other instructions, those instructions should be assigned to the same tile as the instruction that computes the branch condition. Otherwise, a communication cycle would occur between tiles. The PD module designates other control instructions associated with a control flow condition to be determined at run time for execution in the same tile as instructions upon which the control instruction depends. In some cases, the PD module assigns propagation of branch conditions and other control flow information over paths among the tiles already designated for data communication.

The pipeline distribution process 600 is applied to multiple basic blocks of a program. In this example, the first phase 601 occurs for all basic blocks before any later phase occurs for any basic block; the later phases are performed on one basic block before a final reconciliation phase 605 is performed on the next basic block. In the reconciliation phase 605, the virtual dependency graph is updated based on the assignments of previous basic blocks.

The instructions designated for execution on respective computation units of tiles of a tiled IC (or other type of processor cores of a multicore processor) can be prepared for loading onto the computation units and stored in a memory unit accessible to at least one of the computation units. For example, an electronic system having an integrated circuit with multiple processor cores interconnected by an interconnection network can be configured by loading the instructions into a read only memory (ROM) in preparation for distributing the sets of instructions to the corresponding computation units when the system is booted.

A more detailed example of a pipeline distribution process that can be performed by the PD module is a spatial software pipelining process described in the thesis submitted to the Massachusetts Institute of Technology by Michelle Duvall in June 2004, entitled "Spatial Software Pipelining on Distributed Architectures for Sparse Matrix Codes," which is incorporated herein by reference. The terminology used in this thesis may differ somewhat from that used herein. In the event of a conflict in terminology, that used herein is controlling. Words such as "must" and "requires" or statements characterizing the usefulness of techniques used in the thesis are not meant to characterize the invention but only the exemplary spatial software pipelining techniques described in the thesis.

Various features of the tiled integrated circuit architecture and programming and compiling techniques described herein can be implemented by modifying versions of the tiled integrated circuits described in U.S. application Ser. No. 11/302, 956, incorporated herein by reference, or in the following publications: "Baring It All to Software: RAW Machines" *IEEE Computer*, September 1997, pp. 86-93, "Space-Time Scheduling of Instruction-Level Parallelism on a Raw Machine," *Proceedings of the Eighth International Conference on Architectural Support for Programming Languages and Operating Systems (ASPLOS-VIII)*, San Jose, Calif., Oct. 4-7, 1998, "Raw Computation" *Scientific American*, August 1999, Vol. 281, No. 2, pp. 44-47, "The Raw Microprocessor: A Computational Fabric for Software Circuits and General Purpose Programs," *IEEE Micro*, March/April 2002, pp. 25-35, and "A 16-issue multiple-program-counter microprocessor with point-to-point scalar operand network," *Proceedings of the IEEE International Solid-State Circuits Conference*, February 2003, each of which is incorporated herein by reference.

It is to be understood that the foregoing description is intended to illustrate and not to limit the scope of the invention, which is defined by the scope of the appended claims. Other embodiments are within the scope of the following claims.

What is claimed is:

1. A method for configuring a system comprising a plurality of computation units interconnected by an interconnection network using a computer system, the method comprising:
    accepting, by the computer system, a set of instructions corresponding to a portion of a program that performs a computation repeatedly;
    identifying subsets of the instructions;
    associating the subsets of instructions with different respective ones of the computation units to form a specification for execution of the set of instructions with execution of the set of instructions according to the specification using a pipeline among at least some of the computation units;
    loading the specification for execution of the set of instructions into a memory unit accessible to at least one of the computation units; and
    distributing the subsets of instructions to the corresponding computation units when the system is booted.

2. The method of claim 1, wherein identifying the subsets of the instructions comprises determining dependencies among subsets of the instructions corresponding to different portions of the computation.

3. The method of claim 2, wherein determining dependencies among subsets of the instructions corresponding to different portions of the computation comprises determining at least one instruction in a first subset that depends on data characterizing an outcome of executing an instruction in a second subset.

4. The method of claim 2, further comprising associating instructions accessing the same data object with the same subset.

5. The method of claim 4, wherein the specification designates the subsets of instructions for execution in respective computation units.

6. The method of claim 4, wherein the data object comprises an array.

7. The method of claim 4, wherein the array comprises a sparse array.

8. The method of claim 2, wherein determining dependencies among subsets of the instructions corresponding to different portions of the computation comprises determining at least one instruction in a first subset that depends on data written by an instruction in a second subset.

9. A computer program product, stored on a computer-readable storage device, for configuring a system comprising a plurality of computation units interconnected by an interconnection network, the computer program comprising instructions for causing a computer system to:
    accept a set of instructions corresponding to a portion of a program that performs a computation repeatedly;
    identify subsets of the instructions;
    associate the subsets of instructions with different respective ones of the computation units to form a specification for execution of the set of instructions with execution of the set of instructions according to the specification using a pipeline among at least some of the computation units;
    load the specification for execution of the set of instructions into a memory unit accessible to at least one of the computation units; and
    distributing the subsets of instructions to the corresponding computation units when the system is booted.

10. The computer program product of claim 9, further comprising instructions for causing the computer system to generate the instructions corresponding to the portion of the program from a program specification.

11. The computer program product of claim 9, wherein identifying the subsets of the instructions comprises determining dependencies among subsets of the instructions corresponding to different portions of the computation.

12. The computer program product of claim 11, wherein determining dependencies among subsets of the instructions corresponding to different portions of the computation comprises determining at least one instruction in a first subset that depends on data characterizing an outcome of executing an instruction in a second subset.

13. The computer program product of claim 11, further comprising instructions for causing the computer system to associate instructions accessing the same data object with the same subset.

14. The computer program product of claim 13, wherein the specification designates the subsets of instructions for execution in respective computation units.

15. The computer program product of claim 13, wherein the data object comprises an array.

16. The computer program product of claim 15, wherein the array comprises a sparse array.

17. The computer program product of claim 11, wherein determining dependencies among subsets of the instructions corresponding to different portions of the computation comprises determining at least one instruction in a first subset that depends on data written by an instruction in a second subset.

* * * * *

UNITED STATES PATENT AND TRADEMARK OFFICE
CERTIFICATE OF CORRECTION

| | |
|---|---|
| PATENT NO. | : 8,250,507 B1 |
| APPLICATION NO. | : 12/909521 |
| DATED | : August 14, 2012 |
| INVENTOR(S) | : Anant Agarwal |

It is certified that error appears in the above-identified patent and that said Letters Patent is hereby corrected as shown below:

In Claim 7, Column 17, Line 55, delete "4," and insert -- 6, --, therefor.

Signed and Sealed this
Twenty-third Day of October, 2012

David J. Kappos
*Director of the United States Patent and Trademark Office*